US011376704B2

(12) United States Patent
Nakamura

(10) Patent No.: US 11,376,704 B2
(45) Date of Patent: Jul. 5, 2022

(54) METHOD OF IDENTIFYING TRAJECTORY OF EDDY CURRENT SENSOR, METHOD OF CALCULATING SUBSTRATE POLISHING PROGRESS, METHOD OF STOPPING OPERATION OF SUBSTRATE POLISHING APPARATUS, METHOD OF REGULARIZING SUBSTRATE POLISHING PROGRESS, PROGRAM FOR EXECUTING THE SAME, AND NON-TRANSITORY RECORDING MEDIUM THAT RECORDS PROGRAM

(71) Applicant: EBARA CORPORATION, Tokyo (JP)

(72) Inventor: Akira Nakamura, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 158 days.

(21) Appl. No.: 16/441,904

(22) Filed: Jun. 14, 2019

(65) Prior Publication Data
US 2019/0389031 A1 Dec. 26, 2019

(30) Foreign Application Priority Data
Jun. 22, 2018 (JP) .................................. 2018-119242

(51) Int. Cl.
*B24B 37/013* (2012.01)
*B24B 49/10* (2006.01)
(Continued)

(52) U.S. Cl.
CPC .............. *B24B 37/013* (2013.01); *B24B 7/22* (2013.01); *B24B 7/228* (2013.01); *B24B 37/042* (2013.01);
(Continued)

(58) Field of Classification Search
CPC ......... B24B 37/013; B24B 7/22; B24B 7/228; B24B 37/005; B24B 37/042; B24B 37/10;
(Continued)

(56) References Cited

U.S. PATENT DOCUMENTS 7,018,271 B2  3/2006  Wiswesser et al.
7,046,001 B2 * 5/2006  Tada ...................... G01B 7/105
                                                          324/230
(Continued)

FOREIGN PATENT DOCUMENTS

JP   2013-222856 A    10/2013
WO   WO 2015/200098 A1  12/2015
WO   WO 2015/200101 A1  12/2015

*Primary Examiner* — Eileen P Morgan
(74) *Attorney, Agent, or Firm* — BakerHostetler

(57) ABSTRACT

To specify a trajectory of an eddy current sensor provided on a polishing table of a substrate polishing apparatus, disclosed is a method of identifying a trajectory of an eddy current sensor as seen from a substrate in a substrate polishing apparatus having a polishing table and a polishing head. The method includes: obtaining a sensor output map as three-dimensional data; polishing the substrate; obtaining a profile of the real-time polishing signal as two-dimensional data; and extracting a trajectory having a profile most similar to the profile of the real-time polishing signal as two-dimensional data from the sensor output map as three-dimensional data and identifying the extracted trajectory as a trajectory of the eddy current sensor as seen from the substrate.

24 Claims, 7 Drawing Sheets

(51) Int. Cl.
  *B24B 7/22* (2006.01)
  *B24B 49/02* (2006.01)
  *B24B 49/05* (2006.01)
  *G01B 7/06* (2006.01)
  *B24B 37/04* (2012.01)

(52) U.S. Cl.
  CPC .............. *B24B 49/02* (2013.01); *B24B 49/05* (2013.01); *B24B 49/105* (2013.01); *G01B 7/10* (2013.01)

(58) Field of Classification Search
  CPC ......... B24B 49/02; B24B 49/04; B24B 49/05; B24B 49/10; B24B 49/105; G01B 7/10; G01B 7/05; G01B 7/06
  USPC .................................. 451/5, 6, 41, 285, 287
  See application file for complete search history.

(56) References Cited

U.S. PATENT DOCUMENTS

| | | | |
|---|---|---|---|
| 8,360,817 B2* | 1/2013 | Ishii | B24B 37/04 451/5 |
| 8,696,924 B2 | 4/2014 | Tada et al. | |
| 9,999,955 B2* | 6/2018 | Kobayashi | G01B 11/0625 |
| 11,065,734 B2* | 7/2021 | Shinozaki | H01L 21/67092 |
| 2006/0166608 A1* | 7/2006 | Chalmers | B24B 49/12 451/6 |
| 2013/0065493 A1* | 3/2013 | Takahashi | H01L 22/26 451/59 |
| 2013/0273814 A1 | 10/2013 | Kobayashi et al. | |
| 2018/0061032 A1* | 3/2018 | Benvegnu | H01L 21/67253 |

* cited by examiner

METHOD OF IDENTIFYING TRAJECTORY OF EDDY CURRENT SENSOR, METHOD OF CALCULATING SUBSTRATE POLISHING PROGRESS, METHOD OF STOPPING OPERATION OF SUBSTRATE POLISHING APPARATUS, METHOD OF REGULARIZING SUBSTRATE POLISHING PROGRESS, PROGRAM FOR EXECUTING THE SAME, AND NON-TRANSITORY RECORDING MEDIUM THAT RECORDS PROGRAM

CROSS-REFERENCE TO RELATED APPLICATION

This application is based upon and claims the benefit of priority of the prior Japanese Patent Application No. 2018-119242, filed on Jun. 22, 2018, the entire contents of which are incorporated herein by reference.

TECHNICAL FIELD

The present invention relates to a method of identifying a trajectory of an eddy current sensor, a method of calculating a substrate polishing progress, a method of stopping operation of a substrate polishing apparatus, a method of regularizing the substrate polishing progress, a program for executing such methods, and a non-transitory recording medium that records the program.

BACKGROUND

There is known a chemical mechanical polishing (CMP) apparatus as one of semiconductor device fabrication machines. A representative CMP apparatus has a polishing table installed with a polishing pad and a polishing head installed with a substrate. In the representative CMP apparatus, a substrate is polished by rotating at least one of the polishing table and the polishing head while a polish liquid is supplied to the polishing pad, and the polishing pad comes into contact with the substrate.

A CMP apparatus having an endpoint detection sensor for detecting a substrate polishing amount or a substrate polishing endpoint is known in the art. As one of the endpoint detection sensors, there is known a sensor capable of detecting a substrate polishing amount or a substrate polishing endpoint using eddy currents (hereinafter, referred to as "eddy current sensor"). The eddy current sensor is configured to detect a thickness of a conductive layer on a substrate surface.

A signal output from the eddy current sensor may change depending on any other factors as well as the thickness of the conductive layer on the substrate surface. Therefore, in order to detect the substrate polishing endpoint using the eddy current sensor with high accuracy, it is necessary to consider a factor that changes amplitude of the signal output from the eddy current sensor.

A factor that changes the amplitude of the signal output from the eddy current sensor may change depending on a place of the substrate. Therefore, in order to detect the substrate polishing endpoint using the eddy current sensor with high accuracy, it is necessary to specify a trajectory of the eddy current sensor as seen from the substrate. In this regard, it is therefore an object of this application to specify a trajectory of the eddy current sensor as seen from the substrate.

SUMMARY

This application discloses a method of identifying a trajectory of an eddy current sensor as seen from a substrate in a substrate polishing apparatus as one embodiment. The substrate polishing apparatus includes a polishing table provided with the eddy current sensor and configured to be rotatable and a polishing head positioned to face the polishing table and configured to be rotatable. The substrate is installable on a surface facing the polishing table. The method includes: obtaining a sensor output map that is a map representing an output signal of the eddy current sensor for a whole surface to be polished of the substrate as three-dimensional data; polishing the substrate by pressing the substrate to the polishing table while rotating the polishing head installed with the substrate and the polishing table; obtaining a profile of a real-time polishing signal that is a signal output from the eddy current sensor during polishing of the substrate as two-dimensional data; and extracting a trajectory having a profile most similar to the profile of the real-time polishing signal as two-dimensional data from the sensor output map as three-dimensional data and identifying the extracted trajectory as a trajectory of the eddy current sensor as seen from the substrate.

DETAILED DESCRIPTION

Figure 1:
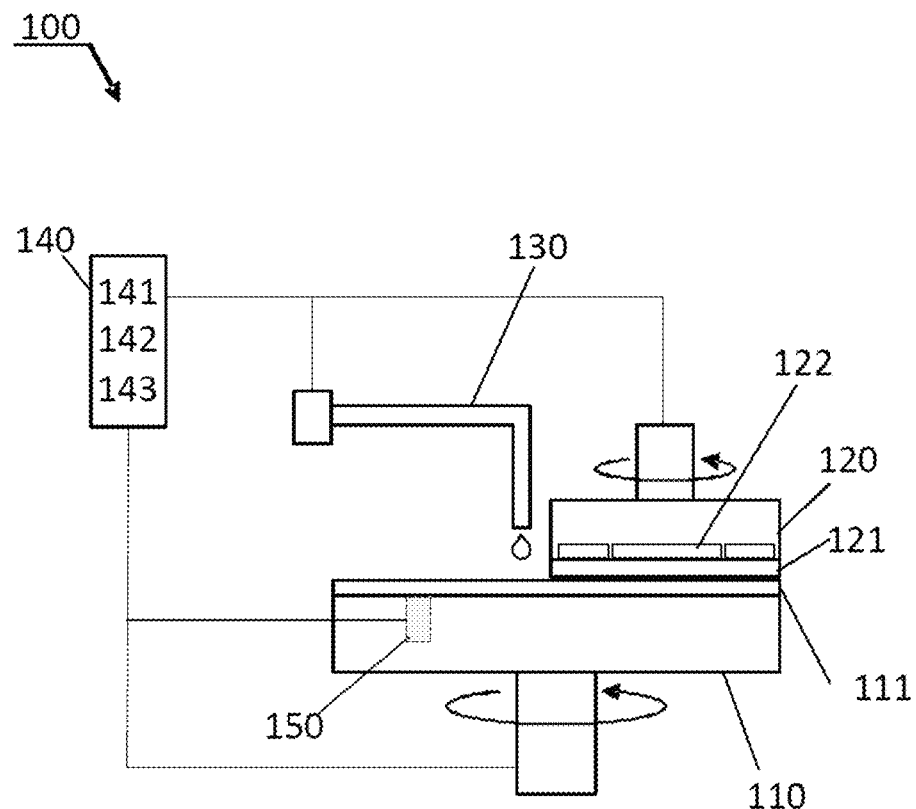
FIG. 1 is front view illustrating a substrate polishing apparatus (CMP apparatus) according to an embodiment of this disclosure.

FIG. 1 is a front view illustrating a substrate polishing apparatus 100 according to an embodiment of this disclosure. The substrate polishing apparatus 100 according to this embodiment is a CMP apparatus 100. However, the substrate polishing apparatus 100 is not limited to the CMP apparatus. Any type of the substrate polishing apparatus 100 may also be employed as long as a substrate can be polished by rotating a polishing table provided with an eddy current sensor.

The CMP apparatus 100 includes a polishing table 110, a polishing head 120, and a liquid supply mechanism 130. The CMP apparatus 100 may further include a controller 140 for controlling each element. The controller 140 may include, for example, a storage device 141, a processor 142, and an input/output device 143.

A polishing pad 111 is detachably installed on an upper surface of the polishing table 110. Here, the "upper surface" of the polishing table 110 refers to a surface of the polishing table 110 facing the polishing head 120. Therefore, the "upper surface" of the polishing table 110 is not limited to a "surface located upward in a vertical direction". The polishing head 120 is provided to face the polishing table 110. A surface of the polishing head 120 facing the polishing table 110 is detachably installed with a substrate 121. The liquid supply mechanism 130 is configured to supply a polish liquid such as slurry to the polishing pad 111. Note that the liquid supply mechanism 130 may also be configured to supply a cleaning liquid or a chemical solution in addition to the polish liquid.

The CMP apparatus 100 may cause the substrate 121 to come into contact with the polishing pad 111 by lowering the polishing head 120 using a vertical movement mechanism (not shown). However, the vertical movement mechanism may also be configured to vertically move the polishing table 110. The polishing table 110 and the polishing head 120 are rotated by a motor or the like (not shown). The CMP apparatus 100 polishes the substrate 121 by rotating both the polishing table 110 and the polishing head 120 while the substrate 121 and the polishing pad 111 come into contact with each other.

The CMP apparatus 100 may further include an airbag 122 segmented into a plurality of sections. The airbag 122 may be provided in the polishing head 120. Additionally or alternatively, the airbag 122 may be provided in the polishing table 110. The airbag 122 is a member for adjusting a polishing pressure of the substrate 121 for each section of the substrate 121. The airbag 122 is configured to change its volume depending on the air pressure introduced to the inside. Note that, although the terminology "air" bag is used, any fluid such as a nitrogen gas or pure water other than the air may also be introduced into the airbag 122.

An eddy current sensor 150 is provided inside the polishing table 110. Specifically, the eddy current sensor 150 is provided in a location passing through a center of the substrate 121 that is being polished. The eddy current sensor 150 generates eddy currents in a conductive layer on the surface of the substrate 121. The eddy current sensor 150 further detects a thickness of the conductive layer on the surface of the substrate 121 from a change of impedance caused by a magnetic field generated by the eddy current. The eddy current sensor 150 (or a controller 140 connected to the eddy current sensor 150 or an operator who reads the output of the eddy current sensor 150) can detect a substrate polishing endpoint from the detected thickness of the conductive layer.

Here, the amplitude of the signal output from the eddy current sensor 150 changes depending on a factor other than the thickness of the conductive layer on the surface of the substrate 121. A factor that changes the amplitude of the signal output from the eddy current sensor 150 may include, for example, a density and width of a wiring line formed on the substrate 121, whether or not there is an underlying wiring line, or the like. Therefore, in order to detect a progressing state of the substrate polishing or detect the substrate polishing endpoint with high accuracy, it is necessary to consider a factor that changes the amplitude of the signal output from the eddy current sensor 150. Note that, here, the "underlying wiring line" refers to a wiring line not exposed on the surface of the substrate 121. Therefore, in FIG. 1, the wiring line placed downward in the vertical direction is the underlying wiring line. However, depending on the orientation of the substrate 121, it is difficult to say that the "underlying" wiring line is placed downward in the vertical direction at all times. Furthermore, although the terminology "wiring line" is employed, the shape of the wiring is not limited to the line shape.

The factor that changes the amplitude of the signal (for example, the density and width of the wiring line, whether or not there is an underlying wiring line, or the like as described above) may change depending on where the substrate 121 is provided. Therefore, in order to detect the substrate polishing endpoint with high accuracy using the eddy current sensor 150, it is necessary to specify which position of the substrate 121 the eddy current sensor 150 measures. In other words, in order to detect the substrate polishing endpoint with high accuracy using the eddy current sensor 150, it is necessary to specify a trajectory of the eddy current sensor 150 as seen from the substrate 121.

Figure 2:
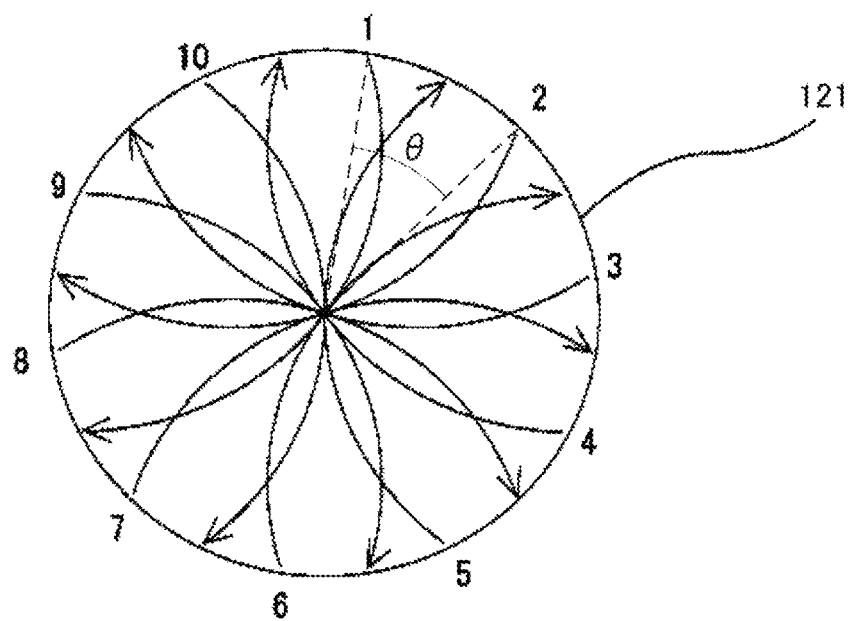
FIG. 2 is a diagram illustrating a trajectory of an eddy current sensor on a substrate as seen from the substrate.

Here, in a case where there is no dimensional error, assembly error, rotation speed error, or the like in each part (hereinafter, referred to as an "ideal situation") at all, and the rotation speeds of the polishing table 110 and the polishing head 120 are combined at a predetermined ratio, the trajectory of the eddy current sensor 150 as seen from the substrate is limited to several cases. For example, in a case where the rotation speed of the polishing table 110 is set to "70 rpm (70 min$^{-1}$)", and the rotation speed of the polishing head 120 is set to 77 rpm (77 min$^{-1}$), the eddy current sensor 150 as seen from the substrate 121 has the trajectory on the substrate 121 illustrated in FIG. 2. FIG. 2 is a diagram illustrating the substrate 121 as seen from the front side, in which the trajectory of the eddy current sensor 150 is indicated by a solid line added with an arrow. Under this condition, the trajectory of the eddy current sensor 150 rotates by 36° whenever the polishing table 110 rotates by one turn. In other words, an interval θ of the trajectory of the eddy current sensor 150 as seen from the substrate 121 is "36°".Therefore, the number of trajectories in this case becomes "ten" (360°/36°=10). Note that the reference numerals "1" to "10" in FIG. 2 denote first to tenth cycles of the trajectory of the eddy current sensor 150.

If the trajectory of the eddy current sensor 150 as seen from the substrate 121 is limited to several cases, it is not necessary to specify the trajectory of the eddy current sensor 150, or it is not difficult to specify the trajectory of the eddy current sensor 150. However, in reality, it is difficult to place the CMP apparatus 100 under the ideal situation. In addition, it is difficult to say that the rotation speed of the polishing table 110 and the rotation speed of the polishing head 120 are constant at all times. Depending on the polishing process, the rotation speed of the polishing table 110 and the rotation speed of the polishing head 120 may change during the polishing of the substrate 121. Therefore, in a real CMP apparatus, it is difficult to say that the trajectory of the eddy current sensor 150 is limited.

In this regard, a method according to one embodiment of this disclosure includes:
  obtaining a map indicating amplitude of an output signal of the eddy current sensor 150 for the entire surface of the substrate 121 to be polished (hereinafter, referred to as a "sensor output map") as three-dimensional data;
  obtaining a profile of a real-time polishing signal as two-dimensional data, in which the real-time polishing signal is a signal output from the eddy current sensor 150 while the substrate 121 is polished by rotating the polishing table 110 and the polishing head 120; and extracting, from the sensor output map which is the three-dimensional data, a trajectory having a profile most similar to the profile of the real-time polishing signal which is the two-dimensional data.

Figure 3:
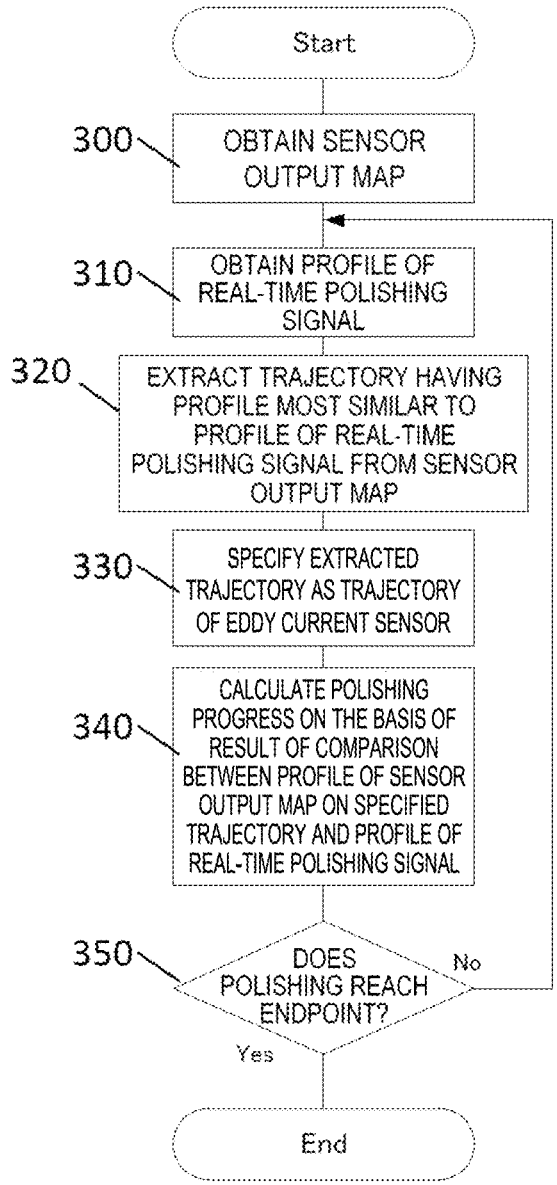
FIG. 3 is a flowchart for describing a method according to an embodiment of this disclosure.

As a result, the trajectory of the eddy current sensor 150 as seen from the substrate is identified. FIG. 3 is a flowchart illustrating a method according to an embodiment of this disclosure. In the following description, first, a method of obtaining the sensor output map will be described, and then, a method of using the sensor output map will be described.

Step 300 is a step of obtaining the sensor output map as three-dimensional data. The obtained sensor output map may be stored in the storage device 141. As described above, the sensor output map shows amplitude of the output signal of the eddy current sensor 150 for the entire surface of the substrate 121 to be polished. Therefore, data points of the sensor output map are located on the substrate 121 in a two-dimensional manner. Since the output signal of the eddy current sensor 150 is recorded for each data point, the sensor output map becomes three-dimensional data (totally, three-dimensional data including two-dimensional data for representing the location and one-dimensional data for representing the amplitude of the output signal). The sensor output map preferably has a resolution (number of data points) by which a change of the output signal of the eddy current sensor 150 can be sufficiently resolved). For example, the number of data points of the sensor output map is preferably set to 100×100 points or more although it depends on the size of the substrate 121, the wiring shape on the substrate 121, and the like. More preferably, the number of data points is set to 1000×1000 points or more. However, the data points of the sensor output map may be represented by any other coordinate system such as an rθ-coordinate system other than the XY-coordinate system.

The sensor output map may be obtained, for example, by being generated from a real output signal of the eddy current sensor 150. The sensor output map is produced from a signal output from the eddy current sensor 150 by operating the CMP apparatus 100, and more specifically, by rotating the polishing table 110 and the polishing head 120.

The interval θ of the trajectory of the eddy current sensor 150 as seen from the substrate 121 to create the sensor output map is preferably set to an interval by which a change of the output signal of the eddy current sensor 150 can be sufficiently resolved. For example, the rotation speeds of the polishing table 110 and the polishing head 120 to create the sensor output map are set such that the interval θ of the trajectory of the eddy current sensor 150 as seen from the substrate 121 becomes equal to or smaller than 10°. For example, in a case where the interval θ of the trajectory of the eddy current sensor 150 as seen from the substrate 121 is exactly "2°", the number of the trajectories becomes "180 (360°/2°=180)". As the eddy current sensor 150 passes through a plurality of trajectories on the substrate 121, the signal of the eddy current sensor 150 is output for nearly the entire surface of the substrate 121. The sensor output map can be created and obtained from the output signal for nearly the entire surface of the substrate 121. As another setting, for example, the rotation speed of the polishing table 110 may be set to "60 rpm", and the rotation speed of the polishing table of the polishing head 120 may be set to "61 rpm". In this case, the interval θ becomes approximately "6°". In addition, it is known that the substrate 121 can rotate inside the polishing head 120 or on the polishing head 120 during the polishing of the substrate 121. In a case where this rotation phenomenon of the substrate 121 may occur, the rotation phenomenon of the substrate 121 may be considered when the interval θ is calculated. For example, the rotation speed of the substrate 121 may be calculated from a formula "(rotation number of polishing head 120)×(inner diameter of polishing head 120)/(outer diameter of substrate 121)". In addition, when the sensor output map is created and obtained, a plurality of combinations of the rotation speeds of the polishing table 110 and the eddy current sensor 150 may also be used.

In order to create the sensor output map, it is necessary to allow the eddy current sensor 150 to pass through a plurality of trajectories. In order to allow the eddy current sensor 150 to pass through a plurality of trajectories, it is necessary to rotate the polishing table 110 many times. For example, in a case where the interval θ is set to exactly "2°", it is necessary to rotate the polishing table 110 at least by 180°. In a case where a polishing agent remains in the polishing pad 111, it is considered that the polishing of the substrate 121 proceeds while the polishing table 110 rotates several times. If the polishing of the substrate 121 proceeds when the sensor output map is obtained, it is difficult to obtain an appropriate sensor output map. Therefore, it is preferable that the sensor output map is obtained under the condition that the substrate 121 is not substantially polished.

In order to prevent the substrate 121 from being substantially polished, it is necessary to remove the polishing agent on the polishing pad 111 to maintain the polishing pad 111 in a clean state. In order to remove the polishing agent on the polishing pad 111 to maintain the polishing pad 111 in a clean state, water (pure water) may be supplied from the liquid supply mechanism 130 to the polishing pad 111 during obtaining the sensor output map. In a case where a clean polishing pad 111 is used, and the polishing pad 111 itself has no polishing effect, the substrate 121 would not be substantially polished. Note that, strictly to say, since the substrate 121 and the polishing pad 111 come into contact, the substrate 121 may be polished (grinded) even when the clean polishing pad 111 is used. However, it is considered that the polishing amount of the substrate 121 under a clean environment would be negligible.

In a case where the polishing pad 111 itself exhibits a polishing effect, for example, in a case where abrasive grains are embedded in the polishing pad 111, or the like, the substrate 121 may be polished even when the polishing pad 111 is maintained clean. In this case, the sensor output map may be obtained after the polishing pad 111 installed in the polishing table 110 is removed, and a polishing pad 111 having no polishing effect is installed in the polishing table 110. The polishing pad 111 may be further replaced (recovered) after the sensor output map is obtained.

Alternatively, in a case where design data of the wiring pattern of the substrate 121 is determined in advance, the sensor output map may be created by simulating the signal output from the eddy current sensor 150 on the basis of the design data of the substrate 121. Alternatively, a sensor output map created or obtained in any method may also be used.

The sensor output map is obtained before the substrate 121 is polished in step 310 described below. In a case where the sensor output map is created from a real output signal of the eddy current sensor 150, the substrate 121 used to obtain the sensor output map is a substrate similar to or separate from the substrate 121 to be polished afterwards. Here, the "similar substrate" refers to "a substrate having an identical wiring pattern formed thereon at least in design consideration". The obtained sensor output map may also be stored in the storage device 141. For example, a corrected sensor output map may also be created on the basis of symmetry of the substrate 121, information on the existing wiring line height, a design value of the wiring height, or the like.

Figure 4:
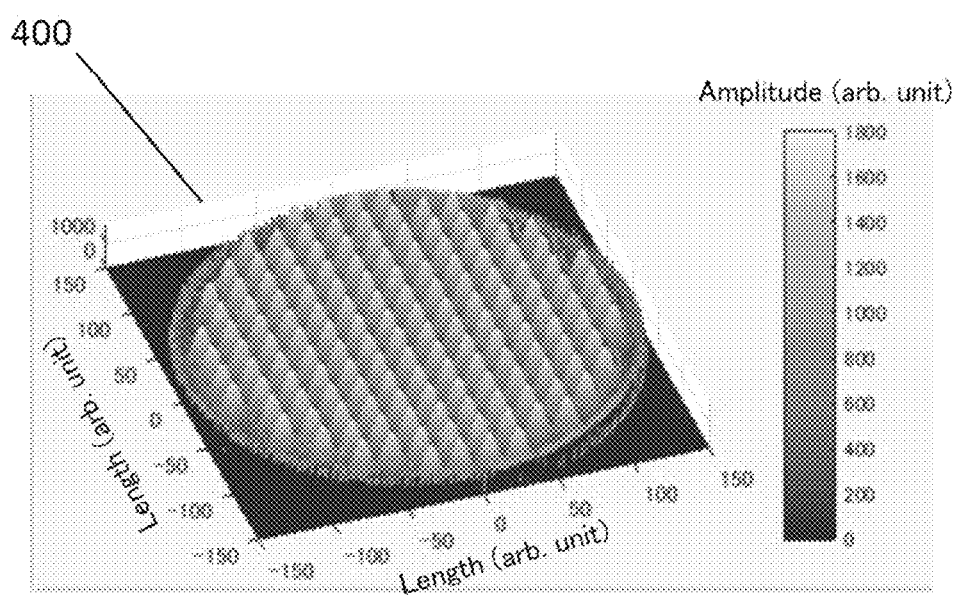
FIG. 4 is a diagram illustrating a first sensor output map.

A first sensor output map 400 obtained using the aforementioned method is illustrated in FIG. 4. The first sensor output map 400 is a map created from the substrate 121 before polishing. However, a sensor output map obtained and created from a polished substrate 121, or a sensor output map obtained and created from an unfinished substrate 121 may also be used. However, the "unfinished substrate" as used herein refers to a substrate that has been polished to an extent that does not reach a desired polishing amount. As recognized from FIG. 4, the first sensor output map 400 has a periodic unevenness distribution. This is because a periodic pattern is formed on the substrate 121 used to create the first sensor output map 400.

The signal value output from the eddy current sensor 150 (or the signal value to be output from the eddy current sensor 150) can be profiled on an arbitrarily shaped line drawn on the obtained sensor output map (such as the first sensor output map 400). That is, it is possible to calculate an arbitrary trajectory profile from the obtained sensor output map.

Step 310 is a step of obtaining a profile of the real-time polishing signal as two-dimensional data while polishing the substrate 121. More specifically, step 310 can be divided into a step of polishing the substrate 121 by pressing the substrate 121 to the polishing table 110 while rotating the polishing head 120 installed with the substrate 121 and the polishing table 110, and a step of obtaining a profile of the real-time polishing signal as two-dimensional data. Here, the "real-time polishing signal" is a signal output from the eddy current sensor 150 while the substrate 121 is polished by rotating the polishing table 110 and the polishing head 120. Here, the "profile" refers to two-dimensional data obtained by plotting the amplitude of the output signal of the eddy current sensor 150 on a certain trajectory (a total of two-dimensional data, including one dimension for indicating a location on the trajectory and one dimension for indicating the amplitude of the output signal). After the sensor output map is obtained in step 300, the operator or controller 140 obtains the signal output from the eddy current sensor 150 (real-time polishing signal) while polishing the substrate 121 by operating the CMP apparatus 100. The profile of the real-time polishing signal preferably has the number of data points by which a change of the output signal of the eddy current sensor 150 can be sufficiently resolved. It is preferable that the number of data points on one profile is equal to or more than "ten points" although it depends on the length of the trajectory, the shape of the wiring line on the substrate 121, or the like. More preferably, the number of data points on one profile is set to one hundred or more.

Step 320 is a step of extracting a trajectory having a profile most similar to the profile of the real-time polishing signal of the eddy current sensor 150 from the sensor output map. Step 330 is a step of identifying the extracted trajectory as a trajectory of the eddy current sensor 150 as seen from the substrate 121. The controller 140 reads the sensor output map from the storage device 141 or the like and extracts a trajectory having a profile most similar to the profile of the real-time polishing signal of the eddy current sensor 150. It is considered that the signals of the eddy current sensors 150 obtained from the same trajectory are similar even when the polishing of the substrate 121 proceeds as long as the polishing of the substrate 121 does not excessively proceed. Therefore, the extracted trajectory can be identified as a trajectory of the eddy current sensor 150 as seen from the substrate 121.

The signal of the eddy current sensor 150 at least partially depends on the thickness of the conductive layer on the surface of the substrate 121. Therefore, the real-time polishing signal of the eddy current sensor 150 changes depending on a progress state of the polishing of the substrate 121. From the viewpoint of the aforementioned description, there may be a difference between the amplitude of the signal of the eddy current sensor 150 at the time of obtaining the sensor output map and the amplitude of the real-time polishing signal of the eddy current sensor 150. In this regard, in step 320, both the amplitude of the signal of the eddy current sensor 150 at the time of obtaining the sensor output map and the amplitude of the signal of the eddy current sensor 150 at the time of obtaining the real-time polishing signal may be normalized. Through the normalization, it is possible to use simple addition or subtraction of the profile cut out from the sensor output map and the profile of the real-time polishing signal. For example, it is possible to determine similarity between both profiles by obtaining a total sum of the difference between a profile of any trajectory of the sensor output map of the eddy current sensor 150 and a profile of the real-time polishing signal of the eddy current sensor 150. In this case, the similarity between both the profiles is determined by a total sum of the differences between both the profiles. For example, it is determined that both the profiles are most similar in a case where the sum of differences is the smallest. Alternatively, the similarity may be determined, for example, by comparing at least one of a peak shape, a peak position, or peak amplitude of a profile on a certain trajectory of the sensor output map and at least one of a peak shape, a peak position, or peak amplitude of the profile of the real-time polishing signal of the eddy current sensor 150. Alternatively, any method of determining the similarity of the profile known in the art may also be employed.

Figure 8:
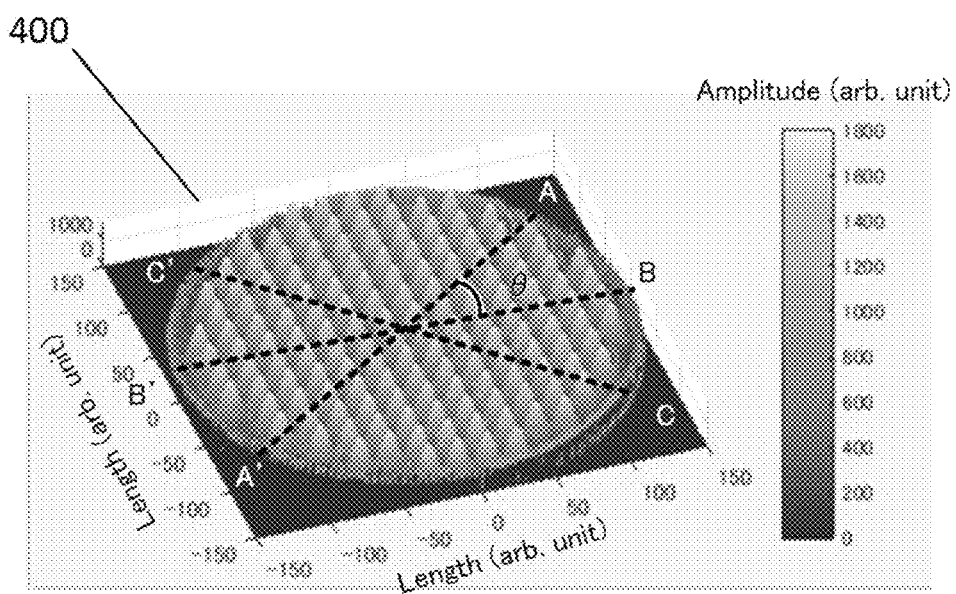
FIG. 8 is a diagram illustrating a sensor output map for describing steps 320 and 330.
Figure 9:
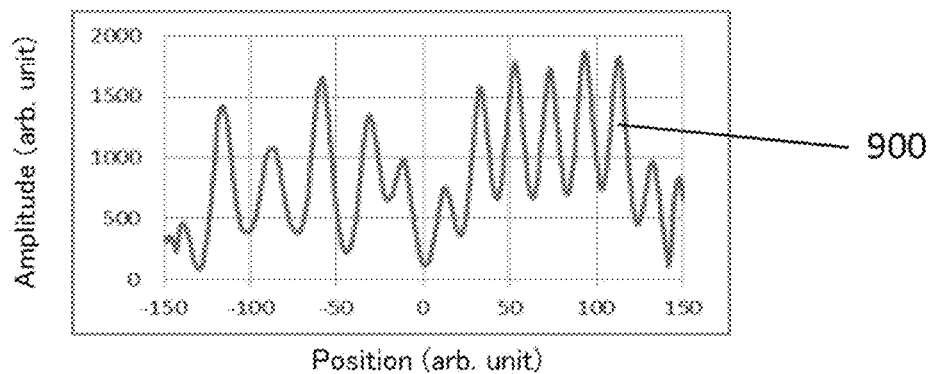
FIG. 9 is a diagram illustrating a profile of a real-time polishing signal for description purposes.

Steps 320 and 330 will be further described with reference to the first sensor output map 400 by way of example. Note that the following description similarly applies to a case where a map other than the first sensor output map 400 is used. From the first sensor output map 400 of FIG. 8, profiles are cut out on trajectories A-A', B-B', and C-C' by way of example. As described below, an angular interval θ between each trajectory (between each profile) may be set to 0.1° or smaller, and the number of profiles cut out may be set to four or more. In addition, as described below, the shape of each trajectory may be a curved shape. Note that each trajectory of FIG. 8 is just for exemplary purposes. In addition, it is assumed that the profile 900 of the real-time polishing signal is obtained as illustrated in FIG. 9 in step 310.

Figure 10:
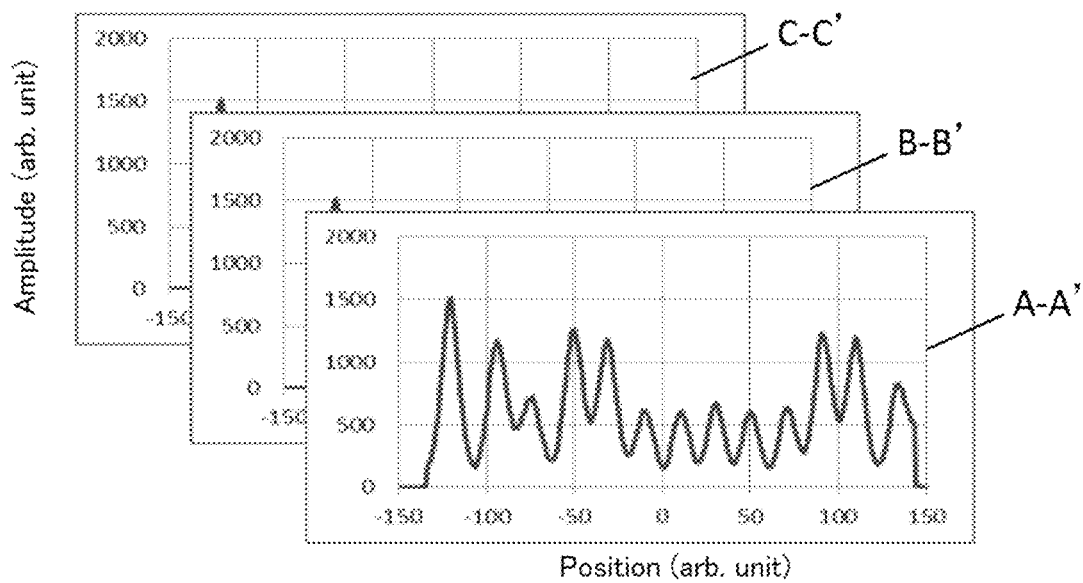
FIG. 10 is a diagram illustrating profiles A-A', B-B' and C-C'.

The controller 140 obtains profiles on each trajectory of the first sensor output map 400. In this example, as illustrated in FIG. 8, the number of trajectories is three. Therefore, in this example, as illustrated in FIG. 10, three profiles are obtained from the first sensor output map 400 (profiles A-A', B-B', and C-C'. Note that the "profile X-X'" refers to a "profile on a trajectory X-X' of the first sensor output map 400"). Note that the profile of FIG. 10 does not exactly reproduce the profile of the first sensor output map 400 of FIG. 8. It should be understood that FIGS. 8 and 10 are illustrated differently for convenient description purposes.

Figure 11:
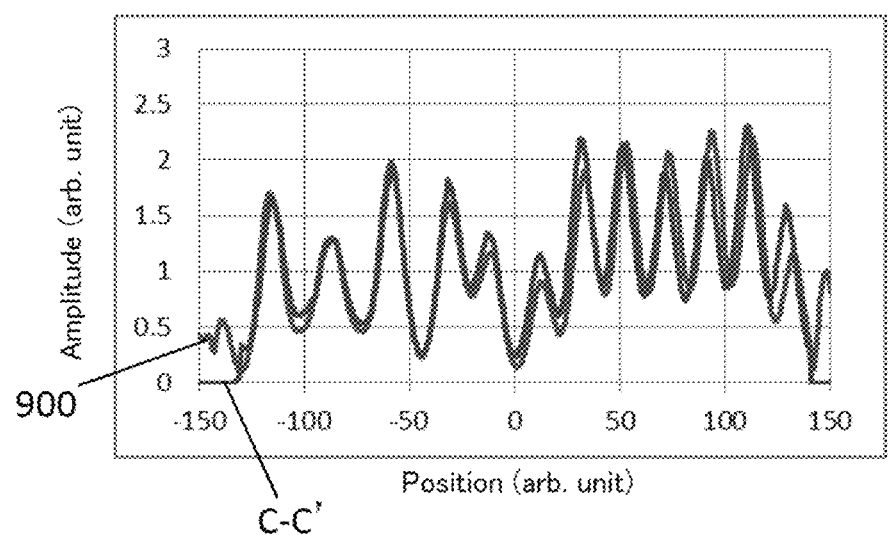
FIG. 11 is a diagram illustrating the profile of the real-time polishing signal of FIG. 9 and the profile C-C' by overlapping them.

The controller 140 extracts a trajectory having a profile most similar to the profile 900 of the real-time polishing signal using any method for comparing the similarity. For example, the controller 140 normalizes the profiles 900, A-A', B-B', and C-C' of the real-time polishing signal and then calculates and/or determines the similarity from a magnitude of a mean square error. In this example, it is assumed that the profile C-C' is calculated as being most similar to the profile 900 of the real-time polishing signal. If the profiles 900 and C-C' of the real-time polishing signal are visualized, they may be illustrated as shown in FIG. 11 (note that the visualization of the profile inside the controller 140 is not necessary). The controller 140 identifies the extracted trajectory C-C' as a trajectory of the eddy current sensor 150 as seen from the substrate 121.

In comparison of the profile similarity, it is preferable that the interval between the profiles cut out from the sensor output map is set as small as possible. According to an embodiment of this disclosure, the profile is cut out from the sensor output map such that the interval θ of the trajectory of the eddy current sensor 150 as seen from the substrate 121 becomes equal to or smaller than "0.1°". Therefore, if the symmetry of the wiring pattern described below is not taken into consideration, 3,600 profiles (360°/0.1°=3,600 (dimensionless number)) are compared with the profile of the real-time polishing signal of the eddy current sensor 150.

In a case where the wiring pattern on the substrate 121 is rotationally symmetrical, the profiles on the symmetric trajectories have substantially the same value. Therefore, in a case where the wiring pattern is rotationally symmetrical, the number of profiles to be compared may be reduced depending on the symmetry. For example, if the wiring pattern is rotationally symmetrical twice, a range of the profile cut out from the sensor output map may be set to "180°". Similarly, in the case of triple rotational symmetry, the range may be set to "120°". In the case of quadruple rotational symmetry, the range may be set to "90°". In the case of n-times rotational symmetry, the range may be set to "360/n°".

Note that the interval between profiles cut out from the sensor output map may be different from the interval θ of the trajectory of the eddy current sensor 150 used to obtain the sensor output map. Since the sensor output map is naturally a map, a profile on an arbitrary trajectory can be cut out from the sensor output map regardless of the trajectory of the eddy current sensor 150 used to obtain the sensor output map.

The trajectory extracted from the sensor output map may be curvilinear. This is because an actual trajectory of the eddy current sensor 150 may be curvilinear as illustrated in FIG. 2. The shape (such as a curvature) of the extracted trajectory may be calculated from shapes, a positional relationship, rotation speeds, or the like of the polishing table 110 and the polishing head 120.

Step 340 is a step of calculating polishing progress of substrate 121 on the basis of a result of the comparison between the profile of the sensor output map for the eddy current sensor 150 on an identified trajectory and the profile of the real-time polishing signal of the eddy current sensor 150. If the first sensor output map 400 is used as the sensor output map, and the polishing progress of the substrate 121 used in step 310 is zero, at least theoretically, the profile of the sensor output map matches the profile of the real-time polishing signal. Therefore, in a case where the polishing progress is zero, it is considered that a total sum of the differences between the profile of the sensor output map and the profile of the real-time polishing signal becomes substantially zero.

As the substrate 121 is polished, the thickness of the conductive film on the surface of the substrate 121 is reduced. Therefore, the real-time polishing signal of the eddy current sensor 150 obtained from the polished substrate 121 would be smaller than the real-time polishing signal of the eddy current sensor 150 obtained from the unpolished substrate 121. Accordingly, it is considered that, if the polishing progress of the substrate 121 is not zero, a total sum of the differences between the profile of the sensor output map and the profile of the real-time polishing signal becomes a non-zero value.

The total sum of the differences between the profile of the sensor output map and the profile of the real-time polishing signal is considered to increase as the polishing of the substrate proceeds. Conversely, it is possible to calculate the substrate polishing progress by multiplying the magnitude of the total sum by a certain coefficient (linear approximation).

Alternatively, the substrate polishing progress may be calculated from a result of comparison between the magnitude of the peak of the profile of the sensor output map on the identified trajectory and the magnitude of the peak of the profile of the real-time polishing signal of the eddy current sensor 150. Alternatively, the polishing progress may be calculated by comparing a signal strength obtained by performing Gaussian fitting for the peak of the profile of the sensor output map and a signal strength obtained by performing Gaussian fitting for the peak of the profile of the real-time polishing signal of the eddy current sensor 150. In addition, any method known in the art for extracting some information from the profiles having similar shapes may also be employed.

Step 350 is a step of determining whether or not the polishing of the substrate 121 reaches the endpoint. In a case where the polishing progress calculated in step 340 is equal to or higher than a predetermined level, that is, if it is determined that the polishing reaches the endpoint, the operation of the CMP apparatus 100 stops. If the polishing progress does not reach a predetermined level, the processing returns to step 310 while continuously performing the polishing of the substrate using the CMP apparatus 100.

In order to calculate the progress state of the polishing of the substrate 121 with high accuracy, it is preferable to store a plurality of sensor output maps in the storage device 141. It is preferable that a plurality of sensor output maps are obtained from the substrates 121 having different polishing amounts or by performing simulation under assumption that the substrates 121 have different polishing amounts. It is possible to calculate the polishing progress with high accuracy by comparing a plurality of sensor output maps and the real-time polishing signal of the eddy current sensor 150. For example, if a plurality of sensor output maps are stored, it is possible to determine the coefficient used in the linear approximation.

Figure 5:
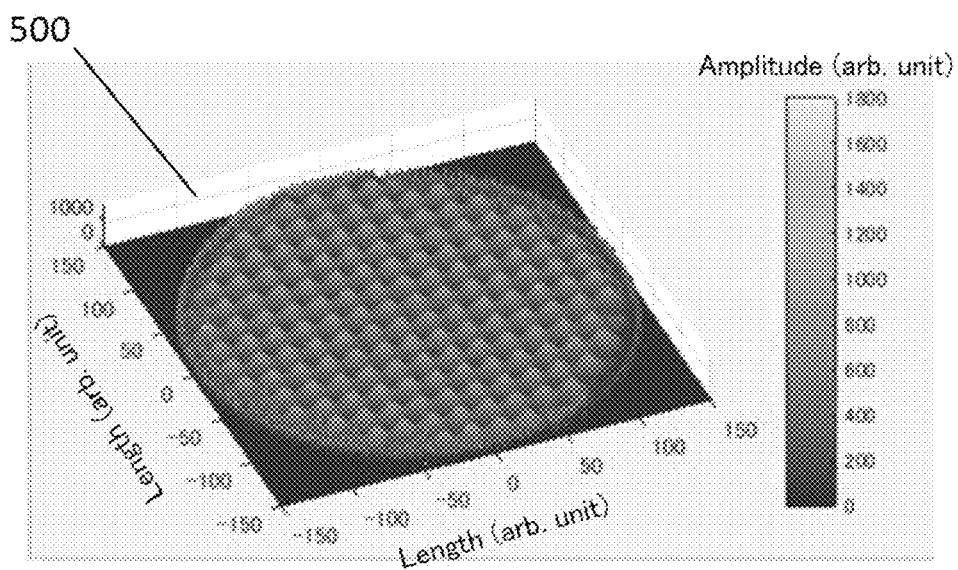
FIG. 5 is a diagram illustrating a second sensor output map.

According to a particularly preferable embodiment, the storage device 141 stores at least the sensor output map of the unpolished substrate 121 (the first sensor output map 400 described above) and the sensor output map of the polished substrate 121 (the second sensor output map 500). The second sensor output map 500 is illustrated in FIG. 5. The second sensor output map 500 is a map created from the polished substrate 121. Here, the "polished substrate" refers to a "substrate polished just by the desired amount". In addition, note that the terminology "polished" refers to a property of the substrate 121, and does not refer to a sequence of the steps. Note that obtainment of the sensor output map using the "polished" substrate 121 is executed "before the polishing step" of step 310 (the substrate 121 polished in step 310 is different from the substrate 121 used in step 300). In a case where the second sensor output map 500 is recorded in the storage device 141, a step of determining whether or not the polishing reaches the endpoint may be executed on the basis of a matching level between the profile of the second sensor output map 500 on the identified trajectory and the profile of the real-time polishing signal, instead of one or both of steps 340 and 350.

In the aforementioned method, it is possible to specify the trajectory of the eddy current sensor 150 as seen from the substrate 121. It is possible to detect the polishing endpoint of the substrate 121 with high accuracy by identifying the trajectory. Information regarding the identified trajectory may also be used for other purposes in addition to the detection of the polishing endpoint. Each step described above may also be performed manually by an operator. Each step described above may be controlled by the controller 140, specifically by the processor 142. The substrate 121 to which this method is applied may be a substrate subjected to "metal clearing", but not limited thereto. Here, "metal clearing" refers to a process of removing a flat metal layer (metal layer that does not serve as a wiring line) formed on the outermost surface of the substrate 121, for example, through plating or the like. Through the "metal clearing", only a metal layer serving as a wiring line remains on the outermost surface of the substrate 121.

In step 340, the polishing progress may be calculated for each region of the substrate 121. For example, a polishing progress for the vicinity of the center of the substrate 121 and the polishing progress for the vicinity of the outer periphery may be calculated separately. In addition, if the flowchart of FIG. 3 is looped several times, the polishing progresses for a plurality of different trajectories are calculated. A map representing the polishing progress of the substrate 121 may be created from the polishing progresses calculated for a plurality of different trajectories. In a case where the polishing progress is calculated for each region, the controller 140 may increase the polishing pressure of the region determined that the polishing progress is low or may decrease the polishing pressure of the region determined that the polishing progress is high, by changing an internal pressure of the airbag 122. Through this control, it is possible to regularize the polishing progress of the substrate 121.

In a case where the apparatus 100 has a plurality of eddy current sensors 150, the sensor output map may be obtained independently for each eddy current sensor 150. Meanwhile, in a case where each eddy current sensor 150 outputs nearly the same signal, or in a case where the output signals of each eddy current sensor 150 can be normalized, a single sensor output map may be shared by a plurality of eddy current sensors 150.

The method may further include a step of feeding back the real-time polishing signal of the eddy current sensor 150 to the sensor output map as learning data. Through this feedback, it is possible to improve accuracy of the sensor output map. The feedback step is particularly effective, for example, in a case where the amplitude of the signal output from the eddy current sensor 150 changes depending on time.

Polishing of a new substrate 121 using the CMP apparatus 100 may start after it is determined that the polishing reaches the endpoint in step 350. If the new substrate 121 is the same type as that of the substrate 121 that has been used, this method may start from step 310 in the polishing of the new substrate 121.

Each method described above may also be performed on a program basis. The program may be recorded in a computer-readable non-transitory recording medium such as the storage device 141. This program may also be stored in a recording medium other than the storage device 141, such as a CD-ROM or DVD-ROM. The program may also be provided via another means such as the Internet.

Next, a configuration for processing information of the CMP apparatus 100 will be described with reference to FIGS. 6A to 6C. However, in FIGS. 6A to 6C, the CMP apparatus 100 is simply illustrated, and some parts (such as the polishing head 120) are not illustrated.

Figure 6A:
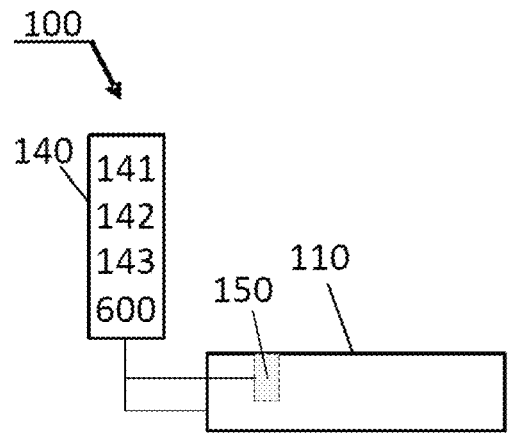
FIG. 6A is a front view illustrating a CMP apparatus provided with a controller having an image processing unit.

FIG. 6A is a front view illustrating the CMP apparatus 100 provided with the controller 140 having an image processing unit 600. The image processing unit 600 may have an artificial intelligence (AI) function. The image processing unit 600 may include, for example, any type of hardware or a program stored in a storage medium. Although, in FIG. 10, the image processing unit 600 is illustrated as an element independent from other elements of the controller 140, the image processing unit 600 may be stored, for example, in the storage device 141, and may be controlled, for example, by the processor 142. The image processing unit 600 is configured to perform a process necessary for image processing and a large amount of computation, such as processes for creating or obtaining the sensor output map in step 300, comparing the sensor output map of step 320 and the real-time polishing signal of the eddy current sensor 150, and providing a feedback by using an actual main signal as learning data. The configuration of FIG. 6A allows the CMP apparatus 100 to operate solely (in a standalone type), which is advantageous.

Figure 6B:
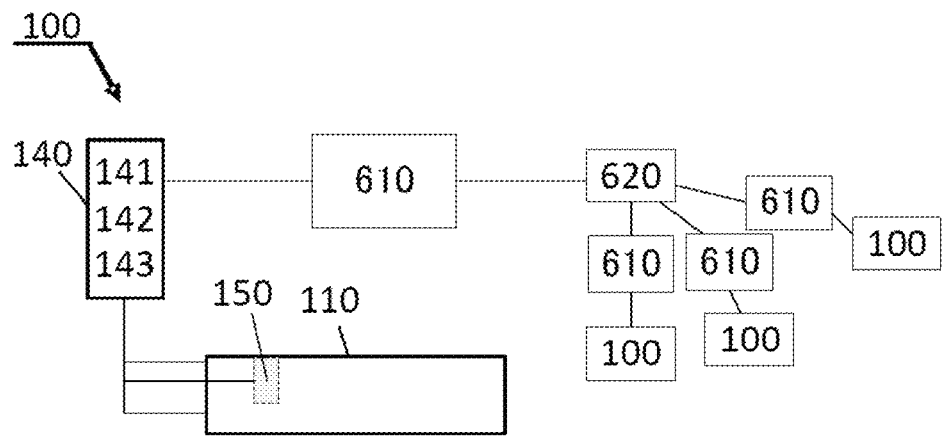
FIG. 6B is a front view illustrating a CMP apparatus connected to a cloud or fog via a router.

FIG. 6B is a front view illustrating the CMP apparatus 100 connected to the cloud (or fog) 620 via a router 610. The router 610 is a device for connecting the controller 140 and the cloud (or fog) 620. The router 610 may be also called "device having a gateway function". The cloud 620 refers to a computer resource provided via a computer network such as the Internet. Note that, in a case where the router 610 and the cloud 620 are connected via a local area network, the cloud 620 may also be called a fog 620 in some cases. For example, the cloud 620 may be used to connect a plurality of factories scattered on the earth, and the fog 620 may be used to build a network in a certain factory. The fog 620 may be further connected to an external fog or cloud. In FIG. 6B, the controller 140 and the router 610 are connected in a wired manner, and the router 610 and the cloud (or fog) 620 are connected in a wired manner. However, each connection may also be established in a wireless manner. A plurality of CMP apparatuses 100 are connected to the cloud (or fog) 620. Each of the plurality of CMP apparatuses 100 is connected to the cloud (or fog) 620 via the router 610. The data (including the output signal from the eddy current sensor 150, the sensor output map, and any other information) obtained by each CMP apparatus 100 are integrated in the cloud (or fog) 620. In addition, the cloud (or fog) 620 of FIG. 6B may have an AI function, so that the data are processed in the cloud (or fog) 620. However, the processing may also be partially performed by the controller 140. The configuration FIG. 6B is advantageous in that the CMP apparatus 100 can be controlled on the basis of a large amount of integrated data.

Figure 6C:
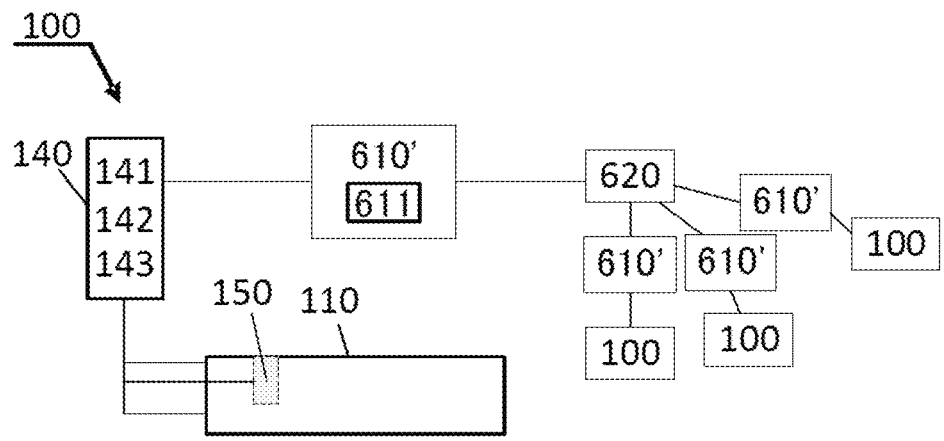
FIG. 6C is a front view illustrating a CMP apparatus connected to the cloud or fog via a router having an edge computing function.

FIG. 6C is a front view illustrating the CMP apparatus 100 connected to the cloud (or fog) 620 via a router 610' having an edge computing function. The cloud (or fog) 620 of FIG. 6C is also connected to a plurality of CMP apparatuses 100. Each of the plurality of CMP apparatuses 100 of FIG. 6C is connected to the cloud (or fog) 620 via the router 610'. However, some of the routers may not have the edge computing function (some of the routers may be the router 610 of FIG. 6B). The router 610' is provided with the controller 611. However, in FIG. 6C, the controller 611 is illustrated only in a single router 610' representatively. In addition, the router 610' may have the AI function. In the AI functions of the controller 611 and the router 610', the data obtained from the controller 140 may be processed in the vicinity of the CMP apparatus 100. Note that the "vicinity", as used herein, is not a terminology referring to a physical distance, but a terminology referring to a distance on the network. However, in many cases, the physical distance is in the vicinity if the distance on the network is in the vicinity. Therefore, if the operation speed of the router 610' and the operation speed of the cloud (or fog) 620 are comparable, the processing of the router 610' becomes faster than the processing of the cloud (or fog) 620. Even when the operation speed is different between the router 610' and the cloud 620, the speed of transmitting information from the controller 140 to the router 610' is faster than the speed of transmitting information from the controller 140 to the cloud (or fog) 620.

The router 610' of FIG. 6C, more specifically, the controller 611 of the router 610' processes only the data necessitating fast processing out of the data to be processed. The controller 611 of the router 610' transmits the data not necessitating fast processing to the cloud (or fog) 620. The configuration of FIG. 6C is advantageous in that both the fast processing in the vicinity of the CMP apparatus 100 and the control based on the integrated data can be achieved.

Figure 7:
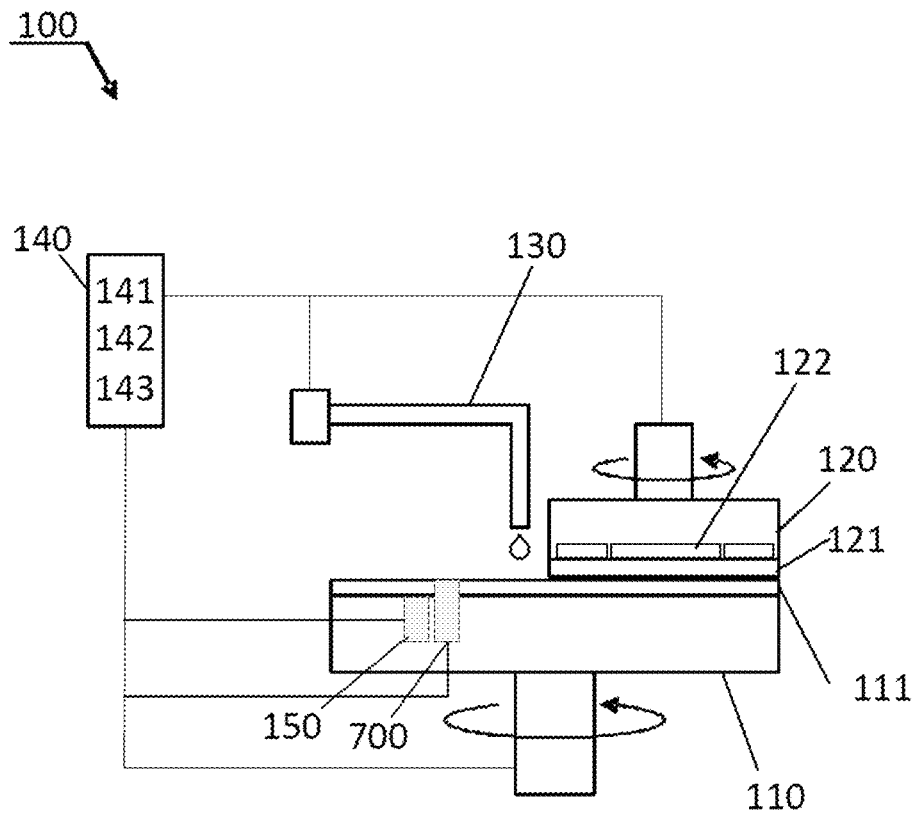
FIG. 7 is a front view illustrating a CMP apparatus further having an optical sensor.

A CMP apparatus 100 having an optical sensor 700 according to another embodiment of this disclosure will be described. FIG. 7 is a schematic front view illustrating the CMP apparatus 100 further having the optical sensor 700. The optical sensor 700 is provided in the polishing table 110 of FIG. 7. Note that, for convenient illustration purposes, the eddy current sensor 150 and the optical sensor 700 are illustrated to be neighbored in the radial direction of the polishing table 110 in FIG. 7. However, the eddy current sensor 150 and the optical sensor 700 may be provided to be neighbored in the circumferential direction of the polishing table 110. In addition, the eddy current sensor 150 and the optical sensor 700 may not necessarily be neighbored. The optical sensor 700 may be provided in an arbitrary position in the polishing table 110 as long as the measurement of the substrate 121 can be performed. The polishing table 110 may also have a plurality of optical sensors 700.

The optical sensor 700 is a sensor for detecting the polishing progress of the substrate 121 by irradiating the surface to be polished of the substrate 121 with irradiation light and measuring the optical property of reflection light reflected on the surface to be polished of the substrate 121. In addition, an opening may also be provided on the polishing pad 111 in order to allow the irradiation light from the optical sensor 700 to reach the substrate 121 and allow the reflection light from the surface to be polished of the substrate 121 to reach the optical sensor 700. An optical fiber for guiding the irradiation light and the reflection light may be disposed inside the opening. A transparent window member may be installed in the opening of the polishing pad 111. Alternatively, a so-called "water sealing type" optical sensor 700 may also be employed. In the water sealing type optical sensor 700, the opening of the polishing pad 111 is not blocked. In a case where the water sealing type optical sensor 700 is installed, water (pure water) is supplied to the opening of the polishing pad 111. The optical sensor 700 may be provided with, for example, a photodetector (photomultiplier).

As described above, the eddy current sensor 150 generates the eddy current and detects the thickness of the conductive layer on the surface of the substrate 121 from a change of impedance caused by a magnetic field generated by the eddy current. The eddy current induced on the detection target may change depending on a resistance value (resistivity) of the target object. Therefore, the signal output from the eddy current sensor 150 may change depending on a material of the detection target. Accordingly, it is difficult to measure the polishing amount of the substrate 121, in which a plurality of materials are mixed, using only the eddy current sensor 150. In particular, in a case where a metal film and an oxide film mixedly exist on the surface of the substrate 121, at least one of the resistance value (resistivity) and the magnetic permeability is considered to be significantly different. Meanwhile, the optical sensor 700 detects an optical property of the reflection light. It is known that the reflectance of the surface to be polished of the substrate 121 changes significantly at the moment that the material of the outermost surface of the substrate 121 changes, that is, at the moment that the film of the outermost surface of the substrate 121 is removed. The optical sensor 700 can detect the endpoint of substrate polishing, for example, from a change of the reflectance of the substrate 121 (change of the reflection light intensity).

As described above, a detection principle of the eddy current sensor 150 is different from a detection principle of the optical sensor 700. The detection value of the optical sensor 700 does not depend on the resistance value (resistivity) of the target object. By using the eddy current sensor 150 and the optical sensor 700 in combination, it is considered that a defect of the eddy current sensor 150 can be compensated, and as a result, the polishing progress of the substrate 121 can be detected with higher accuracy.

The optical sensor 700 can also obtain the sensor output map using the same method as that of the eddy current sensor 150 (refer to step 300 of FIG. 3). Therefore, according to an embodiment of this disclosure, two types of sensor output maps (including the map for the eddy current sensor 150 and the map for the optical sensor 700) are stored in the storage device 141. According to a preferable embodiment of this disclosure, a total of four or more sensor output maps including two or more maps for the eddy current sensor 150 and two or more maps for the optical sensor 700 are stored in the storage device 141.

The same method as that of the eddy current sensor 150 may also be employed to obtain the profile of the real-time polishing signal (refer to step 310 of FIG. 3). Note that, in the following description, the "signal output from the optical sensor 700 during the operation of the CMP apparatus 100" is referred to as a "real-time polishing signal of the optical sensor 700". In the step of obtaining the real-time polishing signal, the real-time polishing signal of the eddy current sensor 150 and the real-time polishing signal of the optical sensor 700 are obtained at the same time. However, the timing for sampling the signal output from the eddy current sensor 150 may not be strictly simultaneous with the timing for sampling the signal output from the optical sensor 700.

After the step of obtaining the real-time polishing signal, a step corresponding to step 320, that is, a step of extracting a trajectory having a profile most similar to the profile of the real-time polishing signal of the eddy current sensor 150 from the sensor output map for the eddy current sensor 150, and extracting a trajectory having a profile most similar to the profile of the real-time polishing signal of the optical sensor 700 from the sensor output map for the optical sensor 700 is executed. After the step of comparison described above, a step corresponding to the step 330, that is, a step of identifying each of the extracted trajectories as each trajectory of the eddy current sensor 150 and the optical sensor 700 as seen from the substrate 121.

In the step corresponding to the step 320 and the step corresponding to the step 330, when the eddy current sensor 150 and the optical sensor 700 are placed substantially in the same position, the trajectories of the eddy current sensor 150 and the optical sensor 700 may be regarded as the same. In the step corresponding to the step 320 and the step corresponding to the step 330, any one of the trajectories of the eddy current sensor 150 and the optical sensor 700 may be calculated and identified on the basis of a positional relationship between the eddy current sensor 150 and the optical sensor 700 or the like.

After the step of identifying the trajectory, a step corresponding to the step 340, that is, a step of comparing the profile of the sensor output map for the eddy current sensor 150 on the identified trajectory and the profile of the real-time polishing signal of the eddy current sensor 150, comparing the profile of the sensor output map for the optical sensor 700 on the identified trajectory and the profile of the real-time polishing signal of the optical sensor 700, and calculating the polishing progress of the substrate 121 on the basis of results of such comparison, is executed.

The progress calculated on the basis of the eddy current sensor 150 and the progress calculated on the basis of the optical sensor 700 may be different. This is because the signals output from each sensor may be different because detection principles are different between the eddy current sensor 150 and the optical sensor 700 as described above. In this regard, in the calculation of the polishing progress, a value obtained by adding a value obtained by multiplying the progress calculated on the basis of the eddy current sensor 150 by a first coefficient "n" and a value obtained by multiplying the progress calculated on the basis of the optical sensor 700 by a second coefficient "m" may be set as the progress. The first and second coefficients "n" and "m" may be suitably set, for example, on the basis of a density of the oxide film on the substrate 121, a resistivity of the conductive layer formed on the substrate 121, a difference of reflectance between the outermost layer of the substrate 121 and the second layer, or the like. For example, in a case where the density of the oxide film on the substrate 121 is high, the first coefficient "n" may be set to be smaller, and the second coefficient "m" may be set to be greater. Conversely, in a case where the density of the oxide film on the substrate 121 is low, the first coefficient "n" may be set to be greater, and the second coefficient "m" may be set to be smaller.

The first and second coefficients "n" and "m" may be different for each region of the substrate 121. For example, in the vicinity of the center of the substrate 121, a first coefficient $n_{center}$ and a second coefficient $m_{center}$ may be used. In the vicinity of the outer periphery of the substrate 121, a first coefficient $n_{periphery}$ and a second coefficient $m_{periphery}$ may be used. In a case where the first and second coefficients "n" and "m" are differently set for each region of the substrate 121, how to divide the substrate may be arbitrarily determined. For example, the substrate 121 may be divided into annular regions, and the first and second coefficients "n" and "m" may be set to be different for each annular region.

After the step corresponding to the step 340, a step corresponding to the step 350 may be executed. In the step corresponding to the step 350, it may be determined whether or not the polishing reaches the endpoint depending on any one of the polishing progress based on the signal output from the eddy current sensor 150 or the polishing progress based on the signal output from the optical sensor 700. Alternatively, in the step corresponding to the step 350, whether or not the polishing reaches the endpoint may be determined on the basis of a value obtained by adding a value obtained by multiplying the progress calculated on the basis of the eddy current sensor 150 by the first coefficient "n" and a value obtained by multiplying the progress calculated on the basis of the optical sensor 700 by the second coefficient "m".

Several embodiments of the present invention have been described hereinbefore. However, the aforementioned embodiments are not to be construed as limiting, but are for descriptive purposes only. Various changes or modifications may be possible without departing from the spirit and scope of the invention, naturally including the equivalents thereof. Furthermore, any combination or omission may be possible for the elements described in claims and specifications as long as at least a part of the aforementioned problems can be addressed, or at least a part of the effects can be achieved.

This application discloses a method of identifying a trajectory of an eddy current sensor as seen from a substrate in a substrate polishing apparatus as one embodiment. The substrate polishing apparatus includes a polishing table provided with the eddy current sensor and configured to be rotatable and a polishing head positioned to face the polishing table and configured to be rotatable. The substrate is installable on a surface facing the polishing table. The method includes: obtaining a sensor output map that is a map representing an output signal of the eddy current sensor for a whole surface to be polished of the substrate as three-dimensional data; polishing the substrate by pressing the substrate to the polishing table while rotating the polishing head installed with the substrate and the polishing table; obtaining a profile of a real-time polishing signal that is a signal output from the eddy current sensor during polishing of the substrate as two-dimensional data; and extracting a trajectory having a profile most similar to the profile of the real-time polishing signal as two-dimensional data from the sensor output map as three-dimensional data and identifying the extracted trajectory as a trajectory of the eddy current sensor as seen from the substrate.

In addition, according to an embodiment of the present invention, a substrate polishing apparatus including: a polishing table installed with an eddy current sensor and configured to be rotatable; a polishing head positioned to face the polishing table and configured to be rotatable, the substrate being installable on a surface facing the polishing table; and a controller, wherein the controller controls the substrate polishing apparatus such that a sensor output map that is a map representing an output signal of the eddy current sensor for a whole surface to be polished of the substrate is obtained as three-dimensional data, the substrate is polished by pressing the substrate to the polishing table while rotating the polishing head installed with the substrate and the polishing table, a profile of a real-time polishing signal that is a signal output from the eddy current sensor during polishing of the substrate is obtained as two-dimensional data, a trajectory having a profile most similar to the profile of the real-time polishing signal as two-dimensional data is extracted from the sensor output map as three-dimensional data, and the extracted trajectory is identified as a trajectory of the eddy current sensor as seen from the substrate.

In the method or the substrate polishing apparatus described above, for example, it is possible to calculate the substrate polishing progress with high accuracy by identifying the trajectory of the eddy current sensor.

In the method according to an embodiment, a shape of the trajectory extracted from the sensor output map is determined at least on the basis of shapes and rotation speeds of the polishing table and the polishing head, and a positional relationship therebetween.

In the method according to an embodiment, the sensor output map is created from a signal output from the eddy current sensor by rotating the polishing table and the polishing head and causing the eddy current sensor to pass through a plurality of trajectories while a substrate of the same type as that of the substrate polished in the polishing step is installed in the polishing head.

In the method according to an embodiment, the sensor output map is created under a condition that the substrate is not substantially polished.

In the method according to an embodiment, the sensor output map is created by simulation based on design data of the substrate polished in the obtaining of the real-time polishing signal.

The method according to an embodiment further includes feeding back the real-time polishing signal to the sensor output map as learning data.

In the method according to an embodiment, a plurality of the sensor output maps are obtained in the obtaining of the sensor output map.

In the method according to an embodiment, at least one of the plurality of the sensor output maps is a map for an unpolished substrate, and at least one of the plurality of the sensor output maps is a map for a polished substrate.

According to these disclosures, it is possible to know details of a method of identifying a trajectory of an eddy current sensor.

In addition, according to an embodiment of the present invention, there is provided a method of identifying a trajectory of the eddy current sensor using the method described above, and calculating a polishing progress of the substrate during the polishing on the basis of a result of comparison between a profile of the sensor output map on the identified trajectory and a profile of the real-time polishing signal.

Using this method, for example, it is possible to calculate the substrate polishing progress with high accuracy.

According to an embodiment of the present invention, there is provided a method of calculating the polishing progress using the method described above and stopping operation of the substrate polishing apparatus when the calculated progress is equal to or higher than a predetermined level.

According to this disclosure, it is possible to know that the polishing progress calculated in the aforementioned method can be used in detection of the polishing endpoint.

According to an embodiment of the present invention, there is provided a method of regularizing a substrate polishing progress, including: identifying a trajectory of the eddy current sensor using the method described above; calculating the substrate polishing progress during the polishing for each region of the substrate on the basis of a result of comparison between the profile of the sensor output map on the identified trajectory and the profile of the real-time polishing signal; and decreasing the polishing pressure for the region calculated that the polishing progress of the substrate is high and/or increasing the polishing pressure for the region calculated that the polishing progress of the substrate is low.

According to an embodiment of the present invention, there is provided a method in which the substrate polishing apparatus has an airbag, and the airbag is used to increase and decrease the polishing pressure.

Using such a method, for example, it is possible to regularize the substrate polishing progress for each region.

According to an embodiment of the present invention, there is provided a program for executing the method described above. In addition, according to an embodiment of the present invention, there is provided a non-transitory recording medium on which the program described above is recorded.

According to these disclosures, it is possible to know details of the program and the recording medium.

REFERENCE SIGNS LIST 100 substrate polishing apparatus (CMP apparatus)
110 polishing table
111 polishing pad
120 polishing head
121 substrate
122 airbag
130 liquid supply mechanism
140 controller
141 storage device
142 processor
143 input/output device
150 eddy current sensor
400 first sensor output map
500 second sensor output map
600 image processing unit
610, 610' router
611 controller
620 cloud or fog
700 optical sensor
900 real-time polishing signal profile used for description
n first coefficient
m second coefficient

What is claimed is:

1. A method for identifying a trajectory of an eddy current sensor as seen from a substrate in a substrate polishing apparatus, wherein
  the substrate polishing apparatus comprises:
    a polishing table provided with the eddy current sensor and configured to be rotatable; and
    a polishing head positioned to face the polishing table and configured to be rotatable, the substrate being installable on a surface facing the polishing table, and
  the method comprises:
    obtaining a sensor output map that is a map representing an output signal of the eddy current sensor for a whole surface to be polished of the substrate as three-dimensional data;
    polishing the substrate by pressing the substrate to the polishing table while rotating the polishing head installed with the substrate and the polishing table;
    obtaining a profile of a real-time polishing signal that is a signal output from the eddy current sensor during polishing of the substrate as two-dimensional data; and
    extracting a trajectory having a profile most similar to the profile of the real-time polishing signal as two dimensional data from the sensor output map as three-dimensional data and identifying the extracted trajectory as a trajectory of the eddy current sensor as seen from the substrate.

2. The method according to claim 1, wherein
  a shape of the trajectory extracted from the sensor output map is determined at least on the basis of shapes and rotation speeds of the polishing table and the polishing head, and a positional relationship therebetween.

3. The method according to claim 1, wherein
the sensor output map is created from the output signal of the eddy current sensor by rotating the polishing table and the polishing head and causing the eddy current sensor to pass through a plurality of trajectories while a second substrate of the same type as the substrate polished in the polishing step is installed in the polishing head.

4. The method according to claim 3, wherein
the sensor output map is created under a condition that the substrate is not substantially polished.

5. The method according to claim 1, wherein
the sensor output map is created by simulation based on design data of the substrate polished in the obtaining of the real-time polishing signal.

6. The method according to claim 1, further comprising feeding back the real-time polishing signal to the sensor output map as learning data.

7. The method according to claim 1, wherein
a plurality of the sensor output maps are obtained in the obtaining of the sensor output map.

8. The method according to claim 7, wherein
at least one of the plurality of the sensor output maps is a map for an unpolished substrate, and
at least one of the plurality of the sensor output maps is a map for a polished substrate.

9. A method of identifying the trajectory of the eddy current sensor using the method according to claim 1, and calculating a polishing progress of the substrate during the polishing on the basis of a result of comparison between a profile of the sensor output map on the identified trajectory and the profile of the real-time polishing signal.

10. A method of calculating the polishing progress using the method according to claim 9 and stopping operation of the substrate polishing apparatus when the calculated progress is equal to or higher than a predetermined level.

11. A method of regularizing a substrate polishing progress, comprising:
identifying the trajectory of the eddy current sensor using the method according to claim 1;
calculating the substrate polishing progress during the polishing for each region of the substrate on the basis of a result of comparison between the profile of the sensor output map on the identified trajectory and the profile of the real-time polishing signal; and
decreasing a polishing pressure for the region calculated that the polishing progress of the substrate is high and/or increasing the polishing pressure for the region calculated that the polishing progress of the substrate is low.

12. The method according to claim 11, wherein
the substrate polishing apparatus has an airbag, and
the airbag is used to increase and decrease the polishing pressure.

13. A non-transitory recording medium on which a program for executing the method according to claim 1 is recorded.

14. A substrate polishing apparatus comprising:
a polishing table installed with an eddy current sensor and configured to be rotatable;
a polishing head positioned to face the polishing table and configured to be rotatable, a substrate being installable on a surface facing the polishing table; and
a controller, wherein
the controller controls the substrate polishing apparatus such that:
a sensor output map that is a map representing an output signal of the eddy current sensor for a whole surface to be polished of the substrate is obtained as three-dimensional data,
the substrate is polished by pressing the substrate to the polishing table while rotating the polishing head installed with the substrate and the polishing table,
a profile of a real-time polishing signal that is a signal output from the eddy current sensor during polishing of the substrate is obtained as two-dimensional data,
a trajectory having a chosen profile most similar to the profile of the real-time polishing signal as trajectory two-dimensional data is extracted from the sensor output map as three-dimensional data, and
the extracted trajectory is identified as a trajectory of the eddy current sensor as seen from the substrate.

15. The substrate polishing apparatus according to claim 14, wherein a shape of the extracted trajectory from the sensor output map is determined at least on the basis of shapes and rotation speeds of the polishing table and the polishing head, and a positional relationship therebetween.

16. The substrate polishing apparatus according to claim 14, wherein
the sensor output map is created from the signal output from the eddy current sensor by rotating the polishing table and the polishing head and causing the eddy current sensor to pass through a plurality of trajectories while a second substrate of the same type as the substrate polished in the polishing step is installed in the polishing head.

17. The substrate polishing apparatus according to claim 16, wherein
the sensor output map is created under a condition that the substrate is not substantially polished.

18. The substrate polishing apparatus according to claim 14, wherein
the sensor output map is created by simulation based on design data of the substrate polished in the obtaining of the real-time polishing signal.

19. The substrate polishing apparatus according to claim 14, wherein
the controller controls the substrate polishing apparatus such that:
the controller feedbacks the real-time polishing signal to the sensor output map as learning data.

20. The substrate polishing apparatus according to claim 14, wherein
a plurality of the sensor output maps are obtained in the obtaining of the sensor output map.

21. The substrate polishing apparatus according to claim 20, wherein
at least one of the plurality of the sensor output maps is a map for an unpolished substrate, and
at least one of the plurality of the sensor output maps is a map for a polished substrate.

22. The substrate polishing apparatus according to claim 14, wherein
the controller controls the substrate polishing apparatus such that:
the controller calculates a polishing progress of the substrate during the polishing on the basis of a result of comparison between a profile of the sensor output map on the identified trajectory and the profile of the real-time polishing signal.

23. The substrate polishing apparatus according to claim 22, wherein
the controller controls the substrate polishing apparatus such that:
the controller stops operation of the substrate polishing apparatus when the calculated progress is equal to or higher than a predetermined level.

24. The substrate polishing apparatus according to claim 14, wherein
the controller controls the substrate polishing apparatus such that:
the controller calculates the substrate polishing progress during the polishing for each region of the substrate on the basis of a result of comparison between the profile of the sensor output map on the identified trajectory and the profile of the real-time polishing signal; and
the controller decreases a polishing pressure for the region calculated that the polishing progress of the substrate is high and/or increases the polishing pressure for the region calculated that the polishing progress of the substrate is low.

\* \* \* \* \*